G. E. STARN.
VEHICLE TIRE.
APPLICATION FILED APR. 23, 1910.
1,035,487.
Patented Aug. 13, 1912.
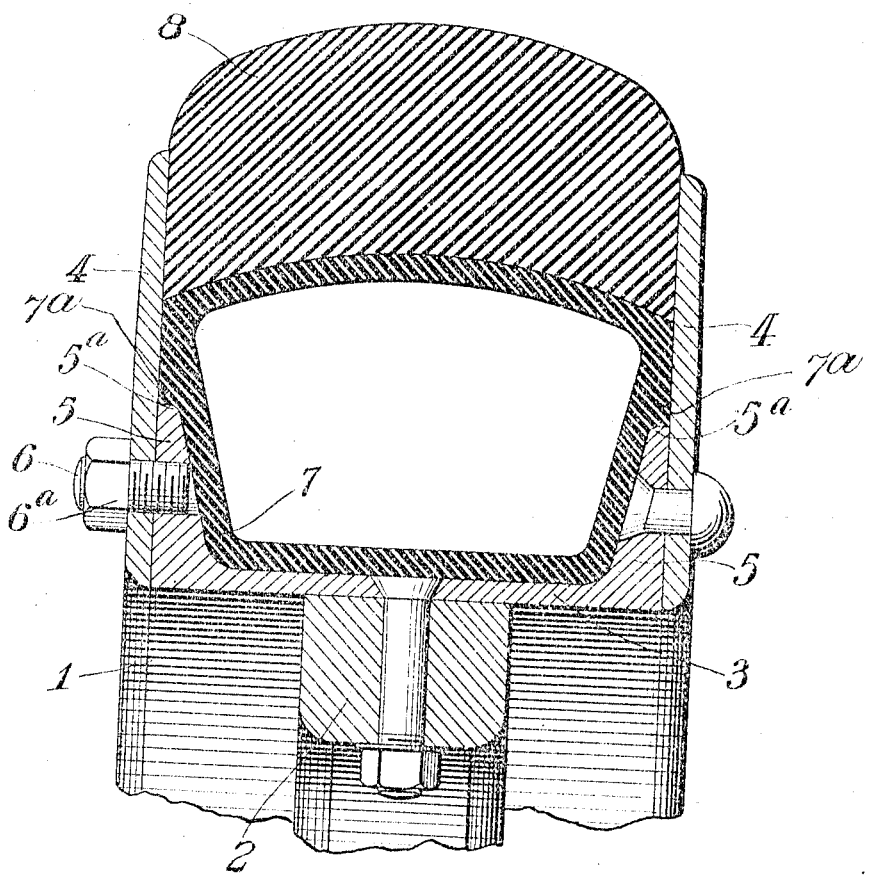

UNITED STATES PATENT OFFICE.

GEORGE E. STARN, OF CAMDEN, NEW JERSEY, ASSIGNOR, BY MESNE ASSIGNMENTS, TO STARN TIRE MANUFACTURING COMPANY, OF CAMDEN, NEW JERSEY, A CORPORATION OF NEW JERSEY.

VEHICLE-TIRE.

1,035,487.

Specification of Letters Patent.   Patented Aug. 13, 1912.

Application filed April 23, 1910.   Serial No. 557,229.

*To all whom it may concern:*

Be it known that I, GEORGE E. STARN, a citizen of the United States, residing at Camden, in the county of Camden and State of New Jersey, have invented certain new and useful Improvements in Vehicle-Tires, of which the following is a specification.

My invention relates to pneumatic tires for vehicle wheels, more particularly for automobiles and other road vehicles.

The object of the invention is to provide an efficient, practicable and serviceable pneumatic tire having improved treading and riding qualities and which will be substantially non-puncturable, and one which, in event of loss of air or deflation of the inner tube, will allow the wheel to travel without contact of the rim with the ground, and hence without damage to the rim or the tire, and also without liability of accidental detachment of the tire from the wheel.

A further object is to provide a construction of the tire and rim which will permit easy adjustment of the tire, or detachment and replacing of the same.

A still further object is to provide a simple, inexpensive and practicable form of manufacture.

The invention will be hereinafter described with reference to the accompanying drawing, and then pointed out in the claim annexed to this specification.

Said drawing is a cross-sectional view of a vehicle rim and tire embodying my improvements.

In said drawing, 1 denotes the rim which contains and supports the tire, and which is shown bolted to the wooden felly 2 of the wheel. The rim, which is preferably made of steel, is substantially U-shaped in cross section, and comprises a broad channeled ring 3 and side plates 4, one of which is fixed and the other removable.

The rim, being in the form of a channeled ring, has annular side flanges 5 and the inner opposed faces of these flanges diverge outward so as to provide extended bracing supports for the inner tube. The edges of these flanges constitute shoulders or abutments 5ª which also form seats or supports for the tire against the side plates which project radially beyond the flanges as shown. In the illustration, the fixed side plate is shown as riveted to one flange 5 while the removable side plate is secured to the opposite flange by a bolt 6 and nut 6ª. It will be readily appreciated that this construction, together with the form of the rim, facilitates the assembling and disassembling of the parts and that, when the removable side plate is detached to permit repairing, the inner tube will be held by the channeled ring until the operator's hands are free. The liability of injury to the inner tube from accidental contact with sharp tools or from other sources is thus reduced to a minimum.

The tire, contained within and embraced laterally between the side plates of the rim, comprises an inner inflatable portion or tubular member 7, and an outer broad, solid tread portion or cap-like member 8 which overlies and is yieldingly supported by the inflatable member; the parts being preferably made as separate elements, the inner inflatable member being of rubber, and the outer solid tread-member being made preferably of fiber though it also may be made of rubber. Both members are in effect clamped between the side plates 4 of the rim, which extend considerably beyond the crown of the inner member and hold the cap-like outer tread member in place. The tread member 8 has a concave base or inner side and is seated upon a convex crown of the inner tube or inflatable member 7; and the latter, having approximately the form of a trapezoid in cross section, fits within the channeled ring 3 and is formed on its outer sides with annular projections 7ª which rest upon the annular shoulders 5ª and thereby support the inner tube or inflatable member all the way around the rim; the inflatable or tubular inner member being so shaped in its construction as to conform to these shoulders or abutments, thus providing a greater surface bearing to carry the load, making a better distribution of the weight, and also giving a more perfect and greater resiliency. At the same time, should loss of air occur and the inner member or tube 7 become deflated, the shoulders or abutments afforded by the flanges 5, to which the air tube is molded to conform, will hold the inner member in proper position and prevent the outer shoe or cap-like tread member from sinking into the rim far enough to allow the latter to contact with the ground; so that, in event of accident to or leakage of the air chamber, an automobile equipped with my tires is permitted to proceed without delay for repairs and without damage to the vehicle, for the tread will always contact with the ground and the rim never will. Furthermore, the retreat of the tread portion of the tire into the rim at the lower side of the wheel will never be sufficient to permit the tread to slip out at the upper side of the wheel, for the flanges 5 form a positive stop or abutment which limits the sinking of the tread to a distance less than that between the inflatable member and the outer edges of the side plates 4.

The tire constructed in two parts as illustrated will, when inflated, constitute to all intents and purposes a practically integral tire, having a broad non-puncturable tread overlying a correspondingly broad air-chamber, the form of which in conjunction with the concave base of the tread, and shape of the rim supporting the air chamber, produces a very efficient and springy cushion tire, promoting the comfort of the occupants of the vehicle and relieving the latter from vibration; while the breadth of the tread tends to prevent skidding and contributes to the even running of the machine. The air chamber being incased within the rim and under the tread is protected from puncture and is not liable to rupture.

If it be desired to adjust the parts of the tire, or replace either portion of the whole tire, this may easily be done by removing the detachable side plate 4 of the rim, which makes the detachment and replacing of tires a comparatively simple matter.

I claim as my invention and desire to secure by Letters Patent:

A tire comprising a U-shaped rim adapted to be secured to a felly and presenting in cross section a straight flat base and inner straight faces diverging outwardly from the base to the edges of the rim, said edges forming annular shoulders, side plates projecting from the rim beyond said edges and presenting continuous straight radial faces throughout their extent, an inflatable tube molded to conform to the flat base and inner divergent faces of the rim, and provided on its sides with external annular enlargements bearing upon the annular shoulders or edges of the rim, said enlargements having straight radial outer faces bearing against the straight radial inner faces of the side plates and the radial extent of said enlargements being less than the distance between the enlargements and the edges of the side plates, and a tread member resting upon the inflatable tube and projecting beyond the side plates, said tread member extending between the side plates and having straight radial side faces flush with the outer straight radial faces of the enlargements on the inflatable tube and bearing against the inner straight radial faces of the side plates.

In testimony whereof I affix my signature, in presence of two witnesses.

GEORGE E. STARN.

Witnesses:
JOSEPH G. SMITH,
HENRY H. MARTER, Jr.